Patented Jan. 11, 1927.

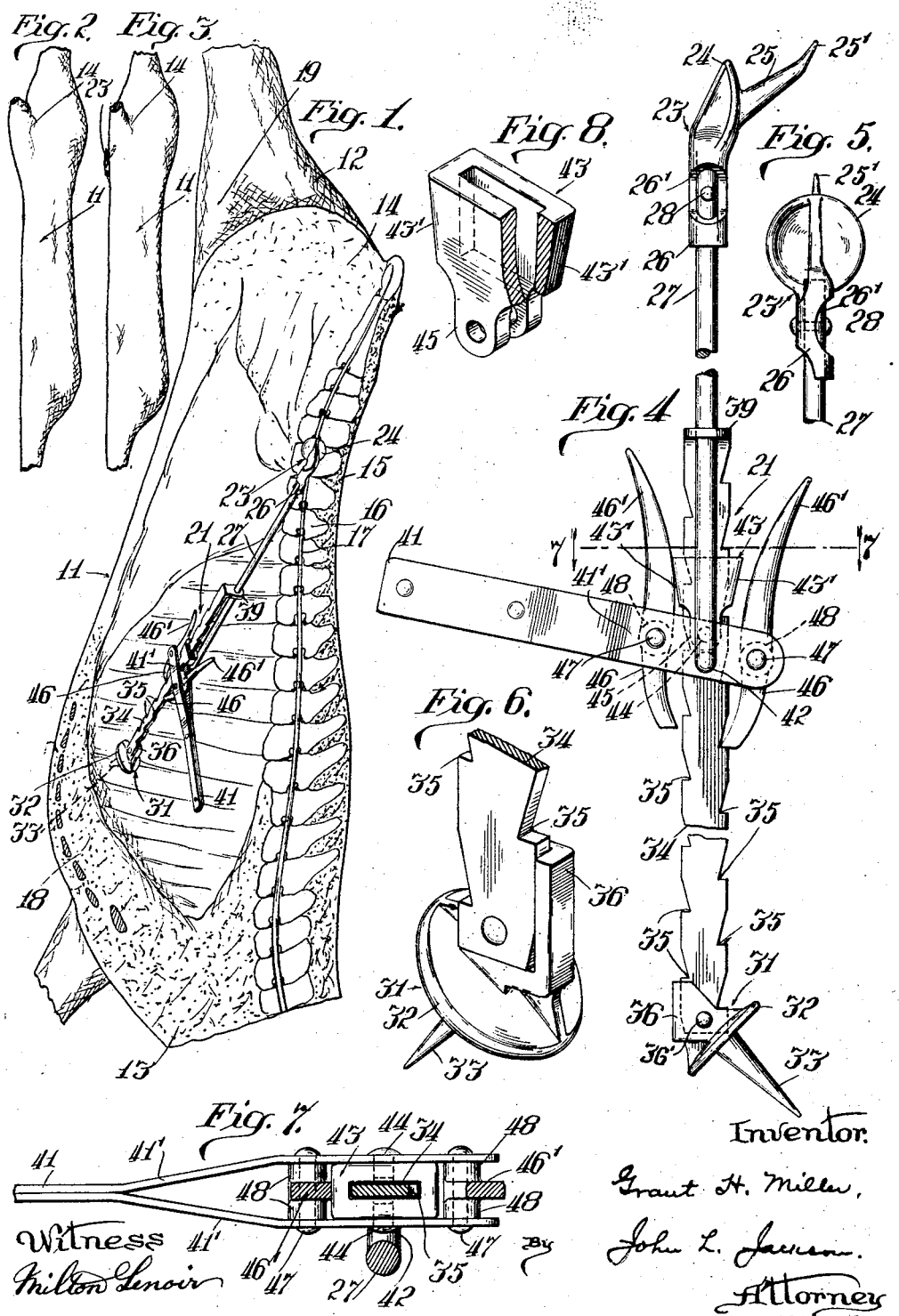

1,614,312

UNITED STATES PATENT OFFICE.

GRANT H. MILLER, OF NEW YORK, N. Y.

METHOD OF AND APPARATUS FOR TREATING BEEF CARCASSES.

Application filed July 19, 1926. Serial No. 123,440.

The present invention relates to an improved method of and apparatus for treating beef carcasses, and embodies improvements upon the invention disclosed in my prior Patent No. 1,160,937, issued to me on the 16th day of November, 1915.

As described at length in this prior patent, in a great proportion of the cattle slaughtered for beef there is a tendency for the loin portion of the backbone to assume a decided inward curvature, by reason of which the loin appears to be comparatively thin or hollow. The loin portion is one of the most expensive cuts in the carcass, and hence the inwardly curved condition of the backbone at this point detracts considerably from the apparent value of the carcass. Such inward curvature will often follow, even though in fact the loin is full and in prime condition. The tendency of the backbone to assume this sharp inward curvature may result from various reasons.

In conventional slaughter house practice the carcass is suspended at each hind leg on overhead tracks for gutting and splitting. After the desired internal organs have been removed, the carcass is split down the backbone into right and left halves. Very frequently, the backbone is split unevenly, so that the portion of the backbone in one of the halves is thin, or the backbone may be cracked. The half of beef having this thin or cracked backbone will generally have a decided tendency to curve inwardly at the loin because of this weakened condition of the backbone.

Another reason for the inward curvature at the loin, irrespective of how the backbone has been split, or of the condition of the loin, follows from the practice of suspending each half of the beef carcass from the hind quarter. By suspending the carcass in this manner, the weight of the forequarter is carried through the flank portion of the carcass but the rump or "round" portion is not in line to be suspended through the flank, with the result that the weight of the round bears downwardly on the upper end of the backbone and tends to cause the backbone to sag or curve inwardly. Another decided objection in the resulting shape of the carcass follows from the fact that the "round", through its lack of support, will often tend to swing inwardly or outwardly with respect to the vertical plane of the backbone, producing what may be termed a twisted carcass. Where the round swings laterally in this manner, it most frequently swings toward the inner or cut side of the beef half, drooping downwardly and inwardly. Cutting the backbone thin, or cracking the same, will also tend to cause the round to twist laterally in this manner.

A carcass which has been allowed to chill and set with the loin curved inwardly, or with the round twisted laterally, will retain this abnormal shape, and in such shape is frequently judged as being in poor condition and not entitled to as high a price as if this abnormal shape did not exist.

In my prior patent above mentioned, I have disclosed broadly a method of and apparatus for correcting or reducing the curvature of the backbone at the loin. This prior invention employed a device in the nature of a clamp having a relatively long outer member and a relatively short inner member, the device operating upon the principle of engaging the outer side of the backbone with the long outer clamp, and the inner side of the backbone with the short inner clamp, and then drawing the two inner clamps together to pull the curved portion of the backbone outwardly. It will be understood that this clamping device is only left on the carcass until it has become thoroughly chilled and set, at which time the device can be removed without the carcass returning to its abnormal shape. This prior form of clamping device serves to straighten the backbone or reduce its curvature in a most effective manner, but there are certain disadvantages and limitations attendant upon its use which it is the object of the present invention to overcome. For example, the relatively heavy clamping pressure between the outer clamping member and the carcass frequently causes this clamping member to form deep indentations or marks on the back of the carcass, which are objectionable. The lower end of the outer clamping member will also frequently press in and deform the "rib" portion of the carcass. Furthermore, this type of device is of little avail for straightening a twisted carcass; in some cases it is very difficult, if not impossible, to apply the device to a badly twisted carcass; and, what is still more objectionable, the device may, in the act of reducing the curvature of the backbone, even place a twist in the carcass by forcing the "round" inwardly or outwardly relative to the plane of the backbone. These devices are also very heavy, cumbersome to apply, and, in use, extend from the back of the carcass objectionably.

The present method and apparatus are designed to overcome these objections. According to this method, the backbone is straightened or has its curvature reduced, by placing the backbone under an endwise tension, and taking the weight of the round off the backbone. This endwise tension is in the nature of an upward and outward pressure applied to the backbone adjacent the loin, from a point of reaction preferably in the forequarter of the carcass.

In addition to straightening the backbone, or reducing its curvature, this endwise tension also has the desirable action of retaining all portions of the backbone in substantially the same vertical plane, so that any tendency of the round to twist inwardly or outwardly is avoided. This action is also augmented by a unique arrangement of anchoring pin and pressure plate on the straightening tool which engage the backbone adjacent the loin. If the round tends to twist laterally in either direction the tool, acting through this pressure plate, applies a laterally acting corrective pressure to the backbone for holding the carcass against such twisting tendency.

The foregoing method of straightening a beef carcass is performed by an extensible tool in the nature of a jack which, when in operative position, is contained substantially entirely within the carcass. The tool is very light in weight compared to my former device, can be applied with greater facility, and when removed it leaves no objectionable marks on the carcass.

Referring to the accompanying drawing wherein I have shown the preferred manner of practicing my invention:

Figure 1 is a view of a side of beef or beef half, with my improved form of straightening means applied thereto.

Figures 2 and 3 are edge views of a beef half on a smaller scale viewed from the vertebrae edge thereof, Figure 2 showing a condition with the round twisted inwardly, and Figure 3 illustrating how this twist is removed by the present straightening device.

Figure 4 is an elevational view of the straightening device, portions thereof being broken away at each end to permit illustration on a larger scale.

Figure 5 is an elevational view illustrating the rear side of the upper anchoring attachment.

Figure 6 is a perspective view illustrating the lower anchoring attachment.

Figure 7 is a transverse sectional view through the straightening device taken approximately on the plane of the line 7—7 of Figure 4, and Figure 8 is a perspective view, partly in section, of the guide or slide which moves along the toothed portion of the straightening device.

Referring to Figure 1, a side of beef, or beef half, is indicated in its entirety at 11, and comprises the hind-quarter 12, the forequarter 13, the round 14 and loin 15. The carcass is generally split through the center of the backbone, indicated at 16, this plane of splitting extending down through the spinal cord 17. The brisket portion 18 completes the plate portion of the front ribs extending from the vertebrae.

As previously remarked, each beef half is suspended by the hindquarter 12, whereby practically the entire weight of the carcass is suspended along the line of the flank 19. This results in the weight of the round 14 bearing down on the upper end of the backbone 16, tending to curve the same inwardly to an abnormal degree, particularly at the loin 15. Moreover, inasmuch as the round 14 is not subjected to any suspending tension, it is free to swing inwardly or outwardly to produce, in effect, a twisted carcass. Figure 2 illustrates such a condition, the round 14 being illustrated as being swung inwardly beyond the inner or cut side of the carcass.

In accordance with the present method of correcting these conditions, a straightening tool, indicated in its entirety at 21, is interposed between the backbone, at a point adjacent the loin 15, and another point in the carcass against which reaction pressure can be exerted along the proper line to place the backbone under tension, to force the same outwardly, and to take the weight of the round off the upper end of the backbone. In its broadest aspect, this device is in the nature of an extensible jack having devices at its opposite ends for effecting engagement or anchorage with the backbone and with its other point of reaction in the carcass. It is opportune to remark at this point that between each pair of adjacent vertebrae there exists a small laterally extending opening leading from each side of the vertebra through which nerves pass from the spinal cord to the adjacent parts of the animal. These small laterally extending holes constitute ideal points of attachment for engaging the upper end of the device with the backbone. The lower end of the tool is preferably engaged in the forequarter between the fourth and fifth ribs, or thereabouts.

Referring to Figures 4 and 5, the upper attaching member 23 comprises a generally circular pressure plate or disk 24, from the front side of which extends a prong or point 25. This prong preferably extends obliquely relative to the pressure plate 24, and has its extremity turned inwardly as indicated at 25'. In placing the tool, this pointed prong is inserted in one of these laterally extending openings in the vertebræ, adjacent the loin 15, the upward inclination of the prong securely anchoring the fastening member 23 at this point of the backbone under the endwise pressure set up in the tool. The pressure plate 24 bears against the substantially flat surfaces of the adjacent vertebræ, formed in the cleavage of the backbone. This upper attaching member comprises a depending boss portion 26 through which the attaching member is mounted on the upper end of the rod 27, constituting the upper section of the extensible tool. In securing the attaching member 23 to the rod 27, I find it preferable to cut away one side of the boss 26, as indicated at 26' and to pass the attaching rivet 28 through the boss and through the rod at this point. This brings one head of the rivet in direct engagement with the rod and the other head in direct engagement with the boss, so that a rigid connection is secured.

The lower fastening member 31 comprises a diagonally disposed pressure plate 32, from the center of which extends a prong or pin 33. In placing the tool, this prong is forced into the carcass at the desired point, preferably adjacent the fourth or fifth rib of the forequarter. This brings the pressure plate 32 in flat bearing engagement with the inner sides of these ribs, affording a firm point of anchorage against which a heavy thrusting pressure can be exerted for straightening the carcass.

The extensible action of the tool may be obtained by a screw threaded arrangement or by numerous other constructions operable to produce endwise separating pressure between the fastening members 23 and 31. However, I find it preferable to employ a pawl and rack mode of operation in this type of device, inasmuch as this arrangement permits of rapid extending of the tool when applying the same, and an instantaneous release when removing the same from the carcass.

To this end, one of the two extensible members of the tool is provided with notches or teeth for receiving cooperating pawls, this preferably being the lower member 34 of the tool. This lower member consists of a relatively heavy flat bar stamping having notches or shoulders 35 punched out of the opposite edges thereof. The lower end of the bar 34 seats in a right angle bracket step or fitting 36, formed as an integral part of the lower fastening member 31.

As shown in Figures 4 and 6, one side of this bracket step is left open, the bar 34 bearing against the opposite side thereof. A rivet 36' passes through the bar and through the bracket 36, the heads of the rivet engaging with each of these members directly and thus rigidly holding the same together against any possible looseness. The connection between the bar 34 and the attachment member 31 is also reinforced by the engagement of the lower end and side edges of the bar with corresponding surfaces in the bracket 36.

The upper end of the bar 34 is formed with a laterally extending apertured lug 39 through which passes the upper rod 27 of the tool. The lower end of the rod 27 is turned inwardly and is pivotally secured in one side member 41' of an operating handle 41, this point of pivotal attachment being indicated at 42 in Figures 4 and 7. The two side portions of this handle are spread to pass over the outer sides of a slider or guide 43 which has reciprocable movement along the bar 34. The handle 41 is pivotally supported on this slider or guide for rocking movement, by extending pivot pins or rivets 44 through the side portions of the handle and into or through depending pivot lugs 45 formed on the guide.

Two pawls 46, 46 are pivotally supported between the side arm portions of the handle at opposite edges of the bar 34. These pawls are pivoted on rivets or pivot pins 47 passing through the pawls and through the side members 41' of the operating arm. Spacing washers may be mounted on these pivot pins between the sides of the pawls and the lever members 41, or the pawls may be formed with laterally extending boss portions 48, the latter construction being preferable. The lower ends of the pawls curve inwardly for engagement with the shoulders 35, and the upper ends curve outwardly to form handle portions 46' which can be gripped and squeezed together when it is desired to release the pawls for collapsing the tool. It will be observed that the adjacent sides of the guide 43 are sloped obliquely to form cam surfaces 43'. These cam surfaces are engaged by the inner curved sides of the pawls 46 in the ascending movement of each pawl, whereby the lower end of the pawl is cammed inwardly into position to engage in the adjacent notch 35 in the act of rocking the lever 41 up and down.

In the operation of the device, the tool is shortened or contracted to a convenient length, and thereupon the upper prong 25 is thrust into one of the laterally opening holes in the spinal column adjacent the loin 15. The lower prong 33 is then forced into the forequarter of the carcass, preferably, but not necessarily, adjacent the fourth or fifth rib, and toward the plate side of the carcass. By now rocking the operating lever 41, the tool can be extended so as to exert any desired pressure against the chime bone or upper portion of the backbone. The extensible action of the tool will naturally follow from the climbing action of the pawls along the notched bar 34, and after the desired pressure has been obtained the tool will be locked automatically at this extended length.

The upwardly acting pressure component places the backbone under tension, which in itself tends to straighten the backbone or reduce its curvature at the loin. This upward component also takes the weight of the round 14 off the upper end of the backbone and transfers this weight through the tool to the forequarter of the carcass. By thus relieving the backbone of the weight of the round, one of the principal factors tending to curve the spine is removed. Also, by virtue of the diagonal position of the tool when thus applied, an outward pressure component is exerted against the backbone, i. e. outward with respect to the plane of the backbone. This outward pressure also assists in straightening or reducing the curvature of the carcass at the loin.

It will be evident that the act of placing the backbone under tension will tend to draw all portions thereof into a substantially straight line. Thus, if the rump or round 14 tends to swing inwardly toward the cut side of the carcass, as shown in Figure 2, the upwardly acting pressure of the tool will force this round portion of the carcass back into its normal position, with all portions of the backbone substantially in the same plane. Furthermore, it will be evident that the endwise pressure exerted through the tool will result in the relatively broad surface of the upper pressure plate 24 bearing with considerable firmness against the split side of the backbone, and by virtue of the hooked engagement of the prong 25 in the laterally extending opening in the vertebra, this upper point of attachment will be very rigid in character so as to compel the backbone to remain in the same general plane with the tool. Hence, if the round has any tendency to swing outwardly, away from the cut side of the beef half, this tendency is resisted through the lever action of the tool. That is to say, any swinging or twisting of the round outwardly, or away from the cut side of the carcass, would compel similar swinging movement of the tool, and inasmuch as the lower end of the tool is firmly anchored in the forequarter, such twisting tendency of the round is overcome. As a result, the tool functions to remove either an inward or an outward twist from the carcass, as well as to straighten or reduce the curvature of the backbone.

It will be understood that the tool is placed in the carcass while the latter is warm, and is retained therein until the carcass has become chilled and set, after which the carcass will maintain its proper shape with the tool removed. The removal of the tool is effected by merely squeezing the two pawl ends 46' together, which will release the engaged pawl from its adjacent notch 35. The tool in use is contained almost entirely within the carcass, and it leaves no objectionable marks on the carcass. The one type of tool is applicable to either the right or left half of the beef without change or alteration of its parts.

What I claim as my invention and desire to secure by Letters Patent, is—

1. In apparatus for straightening the backbone of an animal carcass, the combination of a first attaching member adapted to engage the carcass adjacent the backbone, a second attaching member adapted to engage the carcass at a point removed therefrom, and means for exerting separating pressure between said members for straightening the backbone.

2. In apparatus for straightening the backbone of an animal carcass adjacent the loin thereof, the combination of means adapted to engage between the backbone of the carcass and another point thereof, and means for placing said first-named means under compression to thrust the backbone outwardly adjacent the loin.

3. An apparatus for straightening the backbone of a beef carcass comprising an extensible member having means adjacent the ends thereof for engaging the carcass at the backbone and at another point thereof, and means for extending said member to exert a separating pressure between said engaging means.

4. A device for straightening the backbone of a beef carcass comprising two members connected for relative longitudinal movement, means adjacent the outer ends of said members for engaging the carcass adjacent the backbone and at a point removed therefrom, and means for extending or separating said members longitudinally to place said device under compression.

5. A device for straightening the backbone of a beef carcass, comprising two longitudinally extensible members, means at the opposite ends of said members for engaging with the carcass at the backbone and at a point removed therefrom, teeth in one of said members, and means cooperating with said teeth for causing said members to separate longitudinally.

6. A device for straightening the backbone of a beef carcass comprising two members connected together in guided relation for longitudinally extending and contracting movement, means at the outer ends of said members for engaging the carcass at the backbone and at a point removed therefrom, and means comprising a pawl moving with one of said members and engaging shoulders on the other of said members for causing said members to separate longitudinally.

7. In apparatus for straightening the backbone of a beef carcass, the combination of a member adapted to be placed in compression between the backbone of the carcass and another point thereof for thrusting the backbone outwardly adjacent the loin, and means for increasing or diminishing the compression pressure in said member.

8. A device for treating beef carcasses comprising a first engaging means adapted to engage the carcass at the backbone, a second engaging means adapted to engage the carcass at another point removed from the backbone, and means for causing said two engaging means to separate to thereby reduce the curvature of the backbone adjacent the loin, said first engaging means operating to hold the round of the carcass from twisting laterally.

9. A device for treating beef carcasses comprising a prong member adapted to engage in the backbone of the carcass adjacent the loin, engaging means adapted to engage the carcass at a second point removed from the backbone, and extensible means for causing said prong member to separate from said second engaging means to reduce the curvature of the backbone.

10. A device for treating beef carcasses comprising engaging means adapted to engage the loin portion of the backbone, a prong member adapted to engage in the carcass at a point removed from the backbone, and extensible means between said engaging means and said prong member for reducing the curvature of the backbone.

11. A device for treating beef carcasses comprising a pair of bar members, prongs at the ends of said bar members adapted to engage in the loin portion of the backbone and in the forequarter portion of the carcass, and means for causing said prongs to separate for reducing the curvature of the loin portion of the backbone.

12. A device for treating beef carcasses comprising a pair of relatively extensible members, means adjacent the end of one of said members for engaging the carcass adjacent the forequarter thereof, and means adjacent the end of the other of said members for engaging the loin portion of the backbone, said latter means comprising a pressure plate and a prong extending at an angle thereto for engaging in an opening in the backbone.

13. A device for treating beef carcasses comprising a pair of bar members, means guiding said bar members for longitudinally extensible motion, prong members at the outer ends of said bar members adapted to engage in the loin portion of the backbone and in another portion of the carcass spaced therefrom, one of said bar members having teeth thereon, a rocking lever pivotally supported on the other of said bar members, and pawls carried by said rocking lever for engaging with said teeth.

14. A device for treating beef carcasses comprising means for engaging the backbone adjacent the round, and means cooperating therewith for holding the round from twisting laterally.

15. A device for treating beef carcasses comprising means for engaging the carcass adjacent the round, a bar extending from said engaging means, and means cooperating with said bar for preventing the round from twisting laterally.

16. A device for treating beef carcasses comprising means for engaging the carcass adjacent the round, a bar extending from said engaging means, and attaching means cooperating with said bar and adapted to effect attachment to another portion of the carcass for preventing the round from twisting laterally.

17. The method of treating a beef carcass which comprises applying an endwise tension to the backbone to sustain the weight of the round and to reduce the curvature of the backbone while the carcass is still warm after slaughtering, and maintaining said tension until the carcass is chilled sufficiently to retain such shape.

18. The method of treating a beef carcass which comprises applying an upward and outward pressure to the loin portion of the backbone to place the backbone under tension and to relieve the latter of the weight of the round, and simultaneously therewith exerting a laterally effective corrective pressure against any tendency of the round to twist laterally.

19. The method of treating a beef carcass which comprises applying an upward pressure to the loin portion of the backbone to place the backbone under tension, and at the same time holding the upper portion of the backbone adjacent the round in substantially the same plane as the remainder of the backbone.

20. The method of treating the carcass of a freshly slaughtered beef which comprises applying a separating pressure between the loin portion of the backbone and another portion of the carcass to thereby lift the round and reduce the curvature of the backbone at the loin, and removing a lateral twist from the round portion of the backbone by applying a lateral pressure thereto.

21. The method of treating a beef carcass which comprises applying a straightening pressure to the loin portion of the backbone and holding the round portion of the backbone in a substantially coincident plane with the loin portion thereof while the carcass is still warm after slaughtering, and maintaining the backbone in such position until sufficiently chilled to retain such shape.

22. The method of treating a beef carcass which comprises applying a laterally effective pressure to the round portion of the backbone to prevent such portion from twisting laterally while the carcass is still warm after slaughtering, and maintaining such pressure until the carcass is chilled sufficiently to hold such shape.

23. The method of treating an animal carcass to reduce the curvature of the loin adjacent the backbone comprising interposing a compression member between the backbone and another point of the carcass.

24. The method of reducing the curvature of the loin in an animal carcass comprising interposing a compression member between the loin portion of the backbone and the brisket or forequarter portion of the carcass.

25. The method of reducing the curvature of the loin in a beef carcass comprising interposing a compression member between the loin portion of the backbone and the opposite side of the carcass and extending said compression member to force the loin portion of the backbone outwardly.

GRANT H. MILLER.